US010476377B2

(12) United States Patent
Bemat et al.

(10) Patent No.: US 10,476,377 B2
(45) Date of Patent: Nov. 12, 2019

(54) CONVERTERS TO PROVIDE LIGHT LOAD OUTPUT

(71) Applicant: Hewlett-Packard Development Company, L.P., Houston, TX (US)

(72) Inventors: Mohamed Amin Bemat, Cypress, TX (US); Daniel Humphrey, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 975 days.

(21) Appl. No.: 14/781,024

(22) PCT Filed: Mar. 28, 2013

(86) PCT No.: PCT/US2013/034333
§ 371 (c)(1),
(2) Date: Sep. 28, 2015

(87) PCT Pub. No.: WO2014/158162
PCT Pub. Date: Oct. 2, 2014

(65) Prior Publication Data
US 2016/0043634 A1 Feb. 11, 2016

(51) Int. Cl.
*H02M 1/42* (2007.01)
*H02M 3/335* (2006.01)
(Continued)

(52) U.S. Cl.
CPC ............ *H02M 1/4225* (2013.01); *G06F 1/26* (2013.01); *H02M 3/33507* (2013.01);
(Continued)

(58) Field of Classification Search
CPC .............................. H02M 1/4225; G06F 1/26
(Continued)

(56) References Cited

U.S. PATENT DOCUMENTS 7,940,035 B2    5/2011  Yang
8,222,772 B1    7/2012  Vinciarelli
(Continued)

FOREIGN PATENT DOCUMENTS

CN    101408789 A    4/2009
JP    2003-169478 A   6/2003
(Continued)

OTHER PUBLICATIONS

Ota et al., "Soft-switching Type Multiple-chip Power Device (M-power)", Proceedings of the 13th International Symposium on Power Semiconductor Devices & ICs. IPSD '01 (IEEE Cat No. 01CH37216), 2001, pp. 373-376.
(Continued)

*Primary Examiner* — Alfonso Perez Borroto
(74) *Attorney, Agent, or Firm* — Hewlett Packard Enterprise Patent Department

(57) ABSTRACT

A power factor correcting (PFC) boost converter is to convert an input to an intermediate DC signal. A direct current (DC)-DC converter is to receive the intermediate DC signal and generate an output associated with an online condition. In response to a light-load indication, the PFC boost converter is to assume a disabled status to pass a rectified input to the DC-DC converter. The DC-DC converter is to convert the rectified input to generate the output associated with a light-load condition. The light-load condition output is provided at a voltage lower than the online condition output.

18 Claims, 5 Drawing Sheets

(51) Int. Cl.
  *G06F 1/26* (2006.01)
  *H02M 7/217* (2006.01)
  *H02M 1/36* (2007.01)
  *H02M 1/00* (2006.01)

(52) U.S. Cl.
  CPC .............. *H02M 7/217* (2013.01); *H02M 1/36* (2013.01); *H02M 2001/007* (2013.01); *H02M 2001/0032* (2013.01); *H02M 2001/0054* (2013.01); *Y02B 70/126* (2013.01); *Y02B 70/1491* (2013.01); *Y02B 70/16* (2013.01); *Y02P 80/112* (2015.11)

(58) Field of Classification Search
  USPC ........................................................ 307/11
  See application file for complete search history.

(56) References Cited

U.S. PATENT DOCUMENTS

| | | |
|---|---|---|
| 8,344,707 B2 | 1/2013 | Melanson et al. |
| 2003/0099119 A1 | 5/2003 | Yamada et al. |
| 2005/0269997 A1* | 12/2005 | Usui ................... H02M 1/4225 323/207 |
| 2007/0145956 A1 | 6/2007 | Takeuchi |
| 2011/0057724 A1 | 3/2011 | Pabon |
| 2012/0236612 A1 | 9/2012 | Uno |
| 2013/0229060 A1* | 9/2013 | Chang ..................... H02J 9/061 307/64 |

FOREIGN PATENT DOCUMENTS

| | | |
|---|---|---|
| JP | 5104947 B2 | 12/2012 |
| TW | 200533041 A | 10/2005 |
| TW | I278172 B | 4/2007 |
| TW | I325681 B | 6/2010 |
| WO | 2010/084444 A2 | 7/2010 |
| WO | 2012/077125 A1 | 6/2012 |

OTHER PUBLICATIONS

International Search Report and Written Opinion received for PCT Patent Application No. PCT/US2013/034333, dated Jan. 14, 2014, 8 pages.

* cited by examiner

US 10,476,377 B2

CONVERTERS TO PROVIDE LIGHT LOAD OUTPUT

BACKGROUND

Power converters may be used to convert an input (e.g., AC) power to an output (e.g., DC) power that is provided for a load. The power converter may be associated with an efficiency level. The efficiency level may vary, depending on the type of load.

BRIEF DESCRIPTION OF THE DRAWINGS/FIGURES

DETAILED DESCRIPTION

Power supplies may be used to provide power to various loads, such as computing systems (e.g., servers) that present various power loads to the power supply. At light loads (e.g., under 75 W) international energy standards (that may be applicable to power factor quality) may be relaxed, allowing room for further power savings. For example, if the input voltage to a power supply is sufficient to provide enough energy storage for signal hold-up without needing voltage boosting, then the power supply may disable its power factor correcting boost converter and peak charge its bulk capacitance to enjoy additional power savings.

Examples described herein may increase power conversion efficiency in standby and other light-load conditions, such as loads associated with computing systems operable in different modes. A light-load condition typically may impose orders of magnitude less power demands than a maximum online power condition. However, a typical power supply that may have a power capacity sized for online power needs (e.g., 500 watts), may be associated with inefficient power conversion efficiency when operated to output a light-load condition (e.g., 6 or 7 watts). Example systems provided herein enable power conversion techniques that may exploit architectures of power delivery and consumption systems (including a power supply, a server, or other components) to improve efficiency in standby or other reduced-power (light-load) conditions. These benefits may be enabled without a need to materially affect cost or architecture of such systems.

Figure 1:
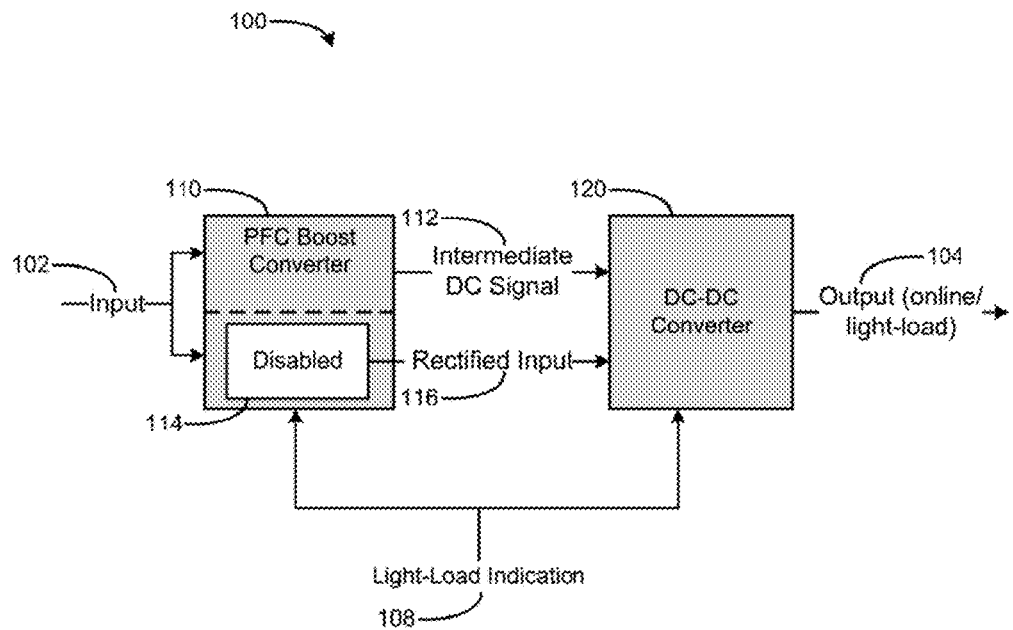
FIG. 1 is a block diagram of a converter apparatus including a power factor correction (PFC) boost converter and a direct current (DC)-DC converter according to an example.

FIG. 1 is a block diagram of a converter apparatus 100 including a power factor correction (PFC) boost converter 110 and a direct current (DC)-to-DC converter 120 (hereafter referred to as DC-DC converter 120) according to an example. The PFC boost converter 110 is to receive input 102 and provide intermediate DC signal 112 to the DC-DC converter 120. The DC-DC converter 120 is to convert the intermediate DC signal 112 to an output 104 associated with an online condition. The PFC boost converter 110 may receive the light-load indication 108, and operate in a disabled mode 114 to provide rectified input 116. The DC-DC converter 120 may convert the rectified input 116 to the output 104 associated with a light-load condition, at a voltage lower than the output associated with the online condition. Apparatus 100 may correspond to a power supply unit, to provide power to a computing system such as a server.

The PFC boost converter 110 may be an alternating current (AC)-DC power factor correcting boost converter, which may receive an AC input signal 102. The PFC boost converter 110 may power factor correct the input 102 power, e.g., received at a power supply, and may loosely regulate a voltage provided to the DC-to-DC converter 120. Thus, the PFC boost converter 110 may power factor correct the input, thereby adjusting an efficiency metric regarding converting current into power (which may be associated with AC power systems).

Thus, the PFC boost converter 110 may perform different functions, regulating an output voltage for the DC-DC converter, and correcting the input current provided to the power supply. For example, the PFC boost converter 110 may power factor correct in view of the use of a switching DC-DC converter 120, to cause the input current to appear as a sinusoid (e.g., resistive), and regulate the output to a reasonable level compatible with the DC-DC converter 120.

The DC-DC converter 120 may be an isolating DC-DC converter to generate output 104 at a lower, usable voltage for various load conditions (e.g., a server operable in standby and online conditions). The DC-DC converter 120 is arranged in series with the PFC boost converter 110, to receive the intermediate DC signal 112. The DC-DC converter 120 may output a regulated voltage as output 104. The regulated output 104 is associated with maintaining a target voltage level, and different target regulated voltage levels may be supported (e.g., at 12 volts (V), at 6 V, at 3.3 V, and so on). In an example, the DC-DC converter 120 may convert an intermediate DC signal 112 of 380-400 V down to a regulated output 104 of 12 V.

In operation, apparatus 100 may operate under various conditions, including a light-load condition such as standby. In standby, apparatus 100 may disable the PFC boost converter 110 (if appropriate given the input and/or output voltage needs/conditions). The DC-DC converter 120 may operate in a reduced voltage output mode, such as a fixed duty cycle mode of operation. For example, the DC-DC converter 120 may operate at a highest duty cycle to provide a light-load output 104 that is compatible with the needs of any load devices (e.g., a server in standby mode needing a threshold voltage level to maintain the standby status).

The PFC boost converter 110 may be disabled based on various approaches, and may involve the continued operation of the PFC boost converter 110. For example, the PFC boost converter 110 may operate while in the disabled 114 status, which may involve continued conversion operations (e.g., using a bridge rectifier to convert input 102 to rectified input 116). However, the PFC boost converter 110 may or may not include a bridge rectifier as part of the PFC boost converter 110 specifically, although examples may integrate a bridge rectifier (or other type of rectifier as appropriate). Thus, in the disabled 114 state, the PFC boost converter 110 is to pass the rectified input 116 to the DC-DC converter 120.

Disabling the PFC boost converter 110, e.g., in view of a light-load condition, may eliminate conversion inefficiencies and/or associated overhead losses. Thus, overall conversion efficiency of the apparatus 100 may be increased.

After disabling the PFC boost converter 110, a bulk voltage (e.g., an increased voltage accumulated as a result of voltage boosting) will decrease, eventually dropping down to a peak voltage line level of the input 102. The bulk voltage may be provided, e.g., by voltage of an energy storing capacitor associated with the PFC boost converter 110 and/or the DC-DC converter 120. The bulk voltage, during online operation of apparatus 100, may be at a voltage above the peak of the input voltage of the power supply. When the PFC boost converter 110 is operating in a non-disabled state, the bulk voltage is boosted above the input peak (e.g., of an AC input 102). When disabled, the bulk voltage may drain down and remain at peak charge steady state.

When the bulk voltage (e.g., the voltage on the bulk capacitor) has reached steady state, the DC-DC converter 120 may provide a light-load output 104, e.g., at a reduced voltage level compared to the online output 104. The DC-DC converter may provide the light-load output 104 by achieving further efficiency optimization. For example, the DC-DC converter may adjust its switching, e.g., by setting its duty cycle to a constant value, including a maximum value. This optimization of switching/duty cycle increases the efficiency of the DC-DC converter 120, further increasing overall efficiency and power savings of the apparatus 100. Thus, the apparatus 100 enjoys power savings in the light-load condition, based on the disabled PFC boost converter 110 and the DC-DC converter 120 operating with an adjusted duty cycle (or other voltage reduction techniques for the light-load operation).

The DC-DC converter 120 may provide various benefits, including providing the light-load output 104 at a reduced voltage, at a regulated voltage, using fixed duty cycle, using a maximum duty cycle, and other techniques as appropriate for operating conditions.

In an example, the DC-DC converter 120 is to regulate the light-load output 104 at a minimum threshold input voltage, compatible with a load receiving the light-load output 104. For example, a load may include downstream DC-DC converters, which may have a minimum limiting voltage, and the DC-DC converter 120 may regulate to that minimum threshold voltage (thereby maximizing power savings while still enabling the load to function properly, according to its light-load mode of operation). Thus, providing light-load output 104 for standby operation of a next-generation server, may involve disabling the PFC boost converter 110, and directing the DC-DC converter 120 to regulate the light-load output 104 down to 6 V. The 6 V light-load output 104 enables downstream DC-DC converters of the server to remain functional in standby operation, further converting the light-load output 104 to various levels usable in the standby mode (e.g., converting 6 V to 5 V, 6 V to 3.3 V, and/or 6 V to 1.1 V). Each of those downstream voltage conversions may result in power savings, accumulated across the various converters in the server.

The accumulated total power savings of the apparatus 100 and its load(s) may be compared to an individual potential savings that may be achieved at the apparatus 100 alone. Thus, individually, each of those savings may be smaller on its own, compared to a potential savings that may have been achieved if the apparatus 100 were operated under different settings. For example, providing the light-load output 104 from the DC-DC converter 120 operating at 6 V may be, e.g., 1 watt less efficient compared to providing the output 104 by using a maximum duty cycle at the apparatus 100 that could have potentially outputted 8.5 V. If limiting the consideration only to the apparatus 100 itself and not the effects on any loads receiving the output 104, it would seem at first glance to be less efficient to use 6 V instead of 8.5 V in this example.

However, when expanding the consideration to include power usage at both the apparatus 100 and the load(s) receiving the output 104 (e.g., the server side), it may be that the example 8.5 V output would be less efficient overall. For example, each of the downstream DC-DC converters at the load/server may need to take that 8.5 V output 104, and further convert it down to lower voltages usable in standby mode (e.g., converting 8.5 V to 5 V, to 3.3 V, to 1.1 V, and so on). Thus, using the 6 V output 104 may provide savings at the load, e.g., saving 150 mW per downstream DC-DC converter at the load due to reduced switching losses at each downstream converter. Thus, the initial relative efficiency loss of providing the 6 V output 104 is offset by the accumulated efficiency gains at the load. Thus, examples can save more power overall, even while using an efficiency in the apparatus 100 that itself could be increased if not considering the overall system effects. Thus, examples provided herein may consider overall savings in the apparatus 100 and the expected loads, and how they interact with each other.

The DC-DC converter 120 may achieve a regulated output 104 by varying a switching duty cycle to maintain the output (e.g., maintain a regulated 6 V output). The DC-DC converter 120 may vary its duty cycle based on various techniques, including the use of feedback from its output and/or feed-forward from its input. Regulating the output 104 may enable the apparatus 100 to accommodate fluctuations in voltage levels of the input 102, without passing those fluctuations on to the output 104. It may be that a fixed duty cycle, without regulating, may cause voltage levels of the output 104 to drop if the input 102 drops. Such fluctuation may be acceptable, e.g., if the nominal input 102 is at 8.5 V or 9 V and it dips to 7 V, because 7 V may exceed a threshold value needed at the output 104 (e.g., a 6 V threshold). However, if that example input 102 causes the output to dip to 5.5 V, then the output 104 may benefit from regulation to avoid falling below that 6 V threshold.

The DC-DC converter 120 may achieve a reduced voltage output 104 (e.g., for light-load conditions) based on the use of a fixed duty cycle. The use of a fixed duty cycle may prevent the DC-DC converter 120 from providing a regulated output (whose regulation arises by varying the duty cycle). However, the fixed duty cycle may result in further power savings and efficiencies. In an example scenario, e.g., a less-demanding server having one processor and two memory modules, total system complexity and power savings may be improved by using the fixed duty cycle approach, and the trade-off of fixed voltage output may be acceptable in such a scenario.

The DC-DC converter 120 may set its duty cycle to a maximum value to maximize efficiency of the DC-DC converter 120. The DC-DC converter 120 may convert based on switching at a rate of, e.g., 100 KHz or 200 KHz. The switching rate may be associated with a fixed amount of loss per switch, incurred from the very act of switching, regardless of whether output 104 is produced. For example, physically turning on and charging a gate of a switch such as a metal-oxide-semiconductor field-effect transistor (MOSFET), and having the voltage drop across it as it turns on, will consume some energy that may add up to a significant amount in the context of high switching rates. Using a maximum duty cycle corresponds to leaving on the switch (transistors) for a maximum duration, thereby transferring a maximum amount of energy per each switching loss.

A voltage level of the output 104 can be a function of the duty cycle and input voltage level to the DC-DC converter 120 (e.g., intermediate DC signal 112 or rectified input 116), which may in turn relate to the voltage level of the input 102. Apparatus 100 may determine the maximum duty cycle corresponding to the input voltage and desired output 104. For example, if input 102 is a relatively high 240 V AC, then the DC-DC converter 120 may avoid using a maximum duty cycle, to avoid creating a relatively too-large output 104. Thus, the apparatus 100 may identify a calculated duty cycle that can be maximized within the constraint of avoiding an overvoltage condition at the output 104.

In an example, apparatus 100 may equate a maximum 100% gain (i.e., attenuation) to a conversion of input 102 at 200 V, to output 104 at 12 V. However, at 50% duty cycle, the conversion would be from 200 V to 6 V. Thus, the apparatus 100 may adjust the duty cycle between 100%-50%, to achieve output 104 between 12 V and 6 V, in view of the input 102 of 200 V. However, if the input 102 fluctuated to 300 V, using a 100% duty cycle would provide the output 104 at 18 V instead of 12 V. To avoid providing 18 V, the apparatus 100 may adjust the duty cycle in view of the input change from 200 V to 300 V, using a 67% duty cycle to achieve an output 104 of 12 V. Thus, the maximum duty cycle would be constrained to 67%, if the input is at 300 V and the output voltage is to avoid exceeding 12 V. This example may be achieved with the PFC boost converter 110 disabled, such that the 300 V input is not further boosted. Accordingly, the example provides efficiency by disabling the PFC boost converter 110, which may otherwise boost the intermediate DC signal 112, e.g., from the 300 V input to 400 V, which would constrain the maximum duty cycle to only 50%. In other words, disabling the PFC boost converter 110 enables a higher duty cycle to be used, which corresponds to higher efficiency by avoiding switching losses. Furthermore, avoiding the higher voltage at the input to the DC-DC converter 120 corresponds to avoiding higher switching losses at each transistor, providing additional efficiency gain through the use of a lower voltage.

In view of the foregoing, examples herein may achieve power efficiency savings using maximum duty cycles. However, other potential downstream power savings are also achievable using a lower voltage and/or duty cycle (including variable duty cycles for output voltage regulation). Thus, examples may or may not rely on use of a maximum duty cycle (e.g., from the perspective of the power delivery side), because from the perspective of power usage, actual system loads may realize additional savings that would offset any increases on the power delivery side.

The apparatus 100 may provide output 104 according to the online and/or light-load condition. For example, if the light-load indication 108 is deasserted, this may indicate a need to transition from the light-load condition to the online condition (e.g., a server coming out of standby to an online status). Apparatus 100 may address such a situation using a startup sequence. Use of a startup sequence may avoid overvoltage conditions at the output 104, e.g., to avoid ramping up a boost to the voltage associated with the PFC boost converter 110 coming out of being disabled 114 while at a 100% duty cycle. Thus, the startup sequence may include reducing a duty cycle (e.g., to less than 100%) and/or regulating output, when enabling the PFC boost converter 110, to account for ramping up voltage. For example, apparatus 100 may, as the input voltage to the DC-DC converter 120 (e.g., intermediate DC signal 112) goes up, the duty cycle may automatically be decreased, which may provide output 104 that, e.g., rises from 8 V to 12 V.

An example startup sequence may proceed as follows. The DC-DC converter 120 may be set to regulate a voltage of the output 104. Following this, the PFC boost converter 110 may be enabled, charging the bulk voltage. As bulk voltage rises, the output 104 may rise until it reaches an output voltage regulation level. At this point, the DC-DC converter 120 may adjust its duty cycle to prevent an over-voltage condition. When the PFC boost converter 110 is online and the voltage of the output 104 is within regulation limits for an online condition, the apparatus 100 may provide a ready signal, which loads such as a server may interpret as authorization to continue their own power up sequence(s) and expect full output 104 consistent with an online condition.

Figure 2:
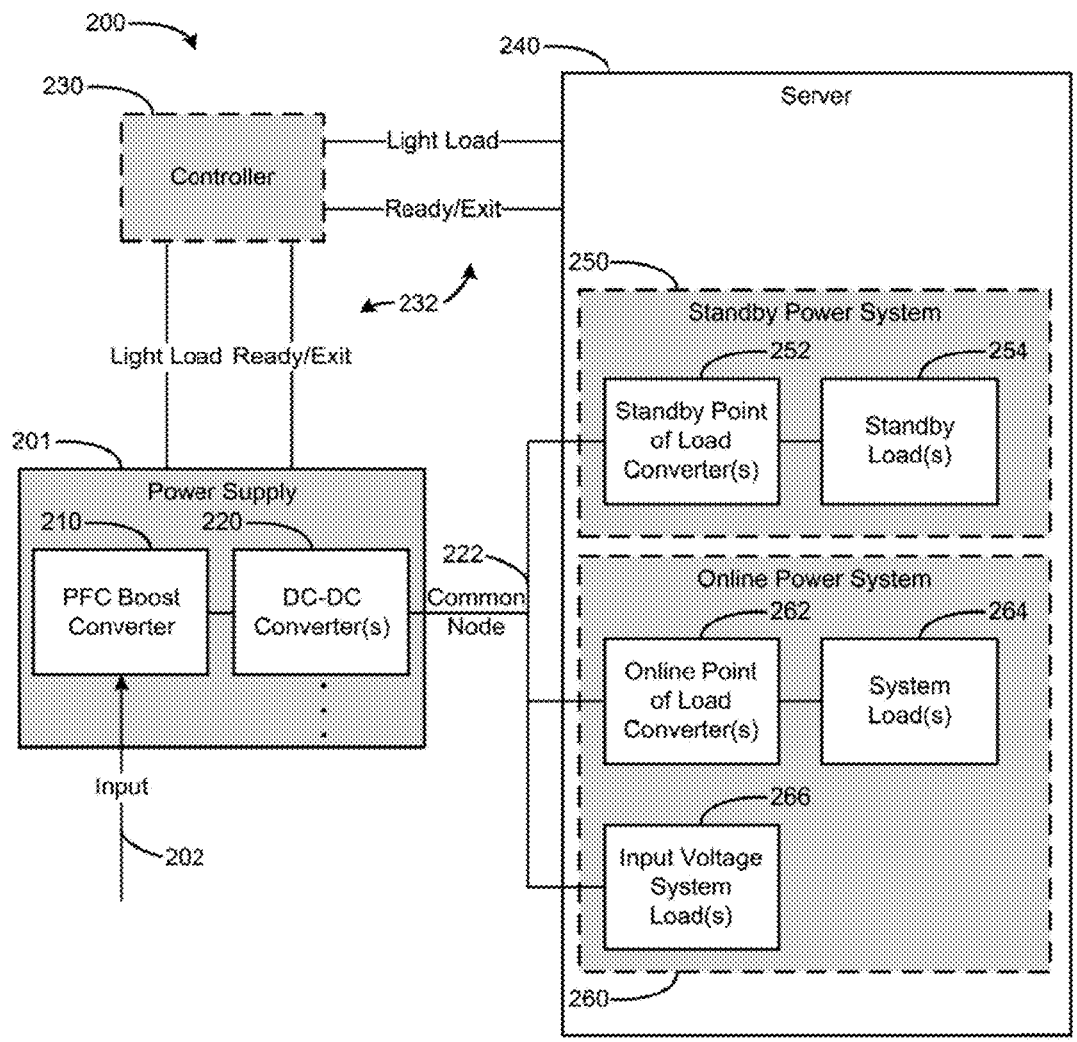
FIG. 2 is a block diagram of a converter system including a controller and power supply according to an example.

FIG. 2 is a block diagram of a converter system 200 including a controller 230 and power supply 201 according to an example. System 200 also may interact with a server 240. The power supply 201 may receive input 202 at the PFC boost converter 210, which is coupled to the DC-DC converter(s) 220. The power supply 201 is coupled to the server 240 via the common node 222. The power supply 201 is coupled to the controller 230 via assertion/communication lines 232, which also may couple the controller 230 to the server 240. The server includes standby power system 250 and online power system 260. The standby power system 250 includes standby converter(s) 252 and standby load(s) 254. The online power system 260 includes online converter(s) 262, system load(s) 264, and input voltage system load(s) 266. Such various components of system 200 may be custom-designed and/or based on industry standard converters and other features, to be controlled by controller 230. FIG. 2 specifically illustrates a server 240. However, server 240 should be interpreted into include other systems associated with multiple operational power modes, including other computing systems and non-computing systems.

Example systems 200 enable increased efficiency in a standby (or other light-load) mode. The controller 230 may disable the PFC boost converter 210 when the server 240 enters a standby mode. Controller 230 may set a duty cycle in DC-DC converter 220 to a maximum value after the server 240 enters the standby mode and a bulk voltage of the power supply 201 bleeds down. The controller 230 may instruct the system 200 to remain in the standby mode until determining that the server 240 is coming out of the light-load mode. In response, the controller 230 may direct the DC-DC converter 220 to regulate its output to a nominal level, enable PFC boost converter 210, and signal the server to indicate that it is okay to resume online operation.

System 200 may be associated with other light-load modes besides standby. Server 240 may be configured to operate in various modes that do not need a full 12 V to operate. For example, operating in an idle or other low-power mode that may involve operations not available during standby. Server 240, in a light-load mode, may still have functionality for networking operations, sending commands, managing the server 240, installing software, updating firmware, and other types of activities that may be carried out in a light-load and/or standby mode. In an example, server 240 may not include any Peripheral Component Interconnect (PCI) cards, and may not use a hard drive (e.g., may use a solid-state disk (SSD) to boot up and retrieve operational information from network area storage (NAS)). The fans of the server 240 may operate at voltages below 12 V, such as 8 V or 7 V. Thus, because the components in server 240 active during this mode do not need the full 12 V online output voltage, the server 240 may operate at a light-load condition between online and standby. Low idle powers below 75 W enable operation without turning on the PFC boost converter 210 because international standards may require power factor correction for loads at or above 75 W.

The controller 230 is shown interacting with assertion lines 232 for light load conditions and ready/exit. The power supply 201 itself may assert a ready signal (or other signals) to the server 240 indicating the server 240 may perform its own power-up sequence and expect full online power delivery from the power supply 201. The power supply 201 may measure its own output power, and compare its capacity (e.g., a 500 W power supply) to its output (e.g., 30 W), to determine that it is operating in a light-load condition. Thus, the functionality represented by controller 230 may be integrated into the power supply 201. Similarly, functionality of controller 230 may be incorporated in the server 240. It is contemplated that a separate controller 230 may be used or omitted in various example systems 200.

The power supply 201 is shown providing a single output to the server, e.g., via common node 222. Thus, system 200 does not need to use separate auxiliary outputs from the power supply 201 to the standby power system 250 and/or the online power system 260. However, in alternate examples, separate outputs may be utilized. For example, multiple outputs may be provided instead of using the common node 222. The common node 222 may be coupled to provide power for the standby load(s) 250 (or a majority of the standby load(s)) and the online load(s) 260 in the system 200.

In an alternate example system 200, separate standby outputs are provided. For example, separate standby outputs, which may be at 12 V, may be provided by a plurality of physically separate DC-DC converters 220. The DC-DC converter 220 that powers the standby output 250 may be controlled to change its duty cycle to accommodate the standby or other light-duty operational modes. A plurality of DC-DC converters 220 may be connected in parallel to be powered off the PFC boost converter 210. In an example, output from one DC-DC converter 220 may go to the standby mode 250, and output from another DC-DC converter 220 may go to the online mode 260. Thus, example systems 200 may use a common output or separate outputs for the standby and online loads.

The standby power system 250 includes standby point-of-load converters 252 to further regulate the output of the power supply 201. These additional downstream converters enable the output of the power supply 201 to vary greatly, enabling new ways to manage power regulation for further efficiency improvements. The standby converter(s) 252 may be DC-DC converters, each of which may be provided specifically for one load. For example, server 240 may have a point of load converter 252 that provides an output voltage just for a management processor. The standby converters 252 have a wide input voltage tolerance, enabling flexibility with power saving techniques used at the power supply 201 and multiplying potential power savings across potentially large numbers of individual standby point of load converters 252. The standby load(s) 254 may include the loads expressed by the converters themselves, or other incidentals that are not operating at 12 V loads.

When in a light-load condition such as standby, server 240 may be associated with not operating hard drive motors, PCI cards, fans or other devices, or operating them below a full 12 V specification. Thus, there is no need for 12 V in that mode. A PCI card may operate in standby at 3.3 V, according to the PCI specification. The standby load may comprise a plurality of lower voltage loads such as this, which is associated with a plurality of regulators that will convert from 12 V to 3.3 V, or 12 V to 1.1 V, or down to 0.75 V, or whatever lower voltage is actually needed.

These converters in the server 240, while normally optimized for 12 V, may operate down to basically whatever the reduced output voltage is, plus a nominal amount depending on various device requirements etc. For example, if a standby converter 252 in the server 240 needs 3.3 V to operate, it may function using an output from the power supply 201 of 5 V to satisfy its 3.3 V needs. But during times where the input 202 is interrupted, the stored bulk voltage in the power supply 201 is used to compensate, and the bulk voltage drops down at the capacitor as energy is pulled from it to compensate. Thus, even in view of the specific requirements of the standby power system 250, the input tolerance of the power supply's DC-DC converter 201 is a wider voltage range due to availability of the bulk voltage.

The online power system 260 of server 240 may include loads that need a regulated input voltage from the power supply 201, as well as loads that need further regulation. The input voltage system loads 266 include loads in the server 240 that use the online output of 12 V, or more generically, the highest regulated voltage that would be provided by the power supply 201. Typically, that value is 12 V for most servers and computer systems. For example, loads such as fans, spinning hard drives, and PCI cards, all which may need a 12 V input when operating in online mode. The system loads 264 may include other loads that may operate in the online mode without needing to use the full 12 V. These may include memory, processors, storage controllers, universal serial bus (USB), and other devices operating at lower voltages.

The server 240 may identify what state of operation it is in, and identify whether it will need 12 V, or whether it may go down to operational voltage needs of 9 V, 8 V, 6 V, and so on. The server 240 may communicate that information to the power supply 201 and/or controller 230 via the communication lines 232.

Examples of controlling system 200 may run on firmware in the power supply and/or server, and may involve hardware implementations to adjust switching and other adjustments. Examples may be provided in systems including both a server 240 and a power supply 201, with or without a dedicated controller 230. Examples also may be provided in a stand-alone power supply 201, stand-alone server 240, and/or a stand-alone controller 230. System 200 may include interactions across multiple components, including interactions between sub-components (e.g., within the power supply 201 and/or the server 240). The server 240 may collaborate with the power supply 201 to achieve efficiencies.

Figure 3:
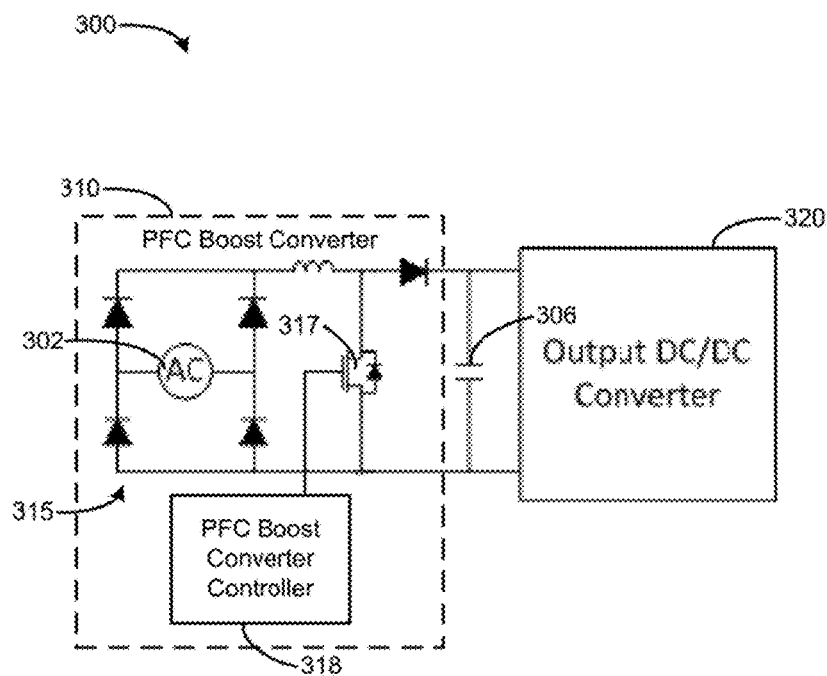
FIG. 3 is a block diagram of a converter system including a PFC boost converter and DC-DC converter according to an example.

FIG. 3 is a block diagram of a converter system 300 including a PFC boost converter 310 and DC-DC converter 320 according to an example. Converter system 300 includes a capacitor 306, shown independent from and coupled to the PFC boost converter 310 and the DC-DC converter 320. However, in alternate examples, the capacitor 306 may be integrated as part of the PFC boost converter 310 and/or the DC-DC converter 320. The PFC boost converter 310 includes a rectifier 315, a switch 317, and a PFC boost converter controller 318 to control the switch 317. The rectifier 315 is to convert the AC input 302 to a rectified and/or intermediate DC signal.

The example PFC boost converter 310 includes a switch 317 (shown as a transistor). The PFC boost converter 310 may be disabled by no longer switching on and off the switch 317 (e.g., keeping the switch 317 in an off/open position). By disabling the PFC boost converter 310, input 302 may be rectified and allowed to pass through to an output without being switched.

The switch 317 may be a transistor, such as a metal-oxide-semiconductor field-effect transistor (MOSFET), an insulated-gate bipolar transistor (IGBT), or similar switch. Turning on the switch 317 charges the inductor, and turning off switch 317 allows the inductor to send its energy through the diode to the output across the capacitor 306, accomplishing boosting. When not switching on/off, the input 302 may pass straight through the diode to the output, and the voltage across the capacitor 306 would assume the rectified voltage of the AC input 302. In addition to saving power by not switching the switch 317, power may be saved by not supplying power to (or putting into a low power state) the PFC boost converter controller 318 (which may otherwise use hundreds of milliwatts to operate). By stopping the switching of switch 317, and possibly putting the controller 318 in a lower power state, the PFC boost converter 310 may be disabled.

The capacitor 306 is associated with the bulk voltage, which is the voltage on the energy storing capacitor 306 between the PFC boost converter 310 and the output DC-DC converter 320. The capacitor 306 may be integrated with the PFC boost converter 310 and/or the DC-DC converter 320, but is shown separately for emphasis. When the PFC boost converter 310 is enabled (e.g., switching the switch 317 on/off), voltage on the capacitor 306 may rise to a level above the peak input voltage 302 of the power supply (e.g., system 300).

In an example, there may be a nominal voltage of approximately 380 V on the output capacitor 306. 380 V may correspond to, e.g., operating the DC-DC converter 320 at a 70% duty cycle to obtain a desired output, representing 70% of the possible gain achievable via adjusting a duty cycle of the output DC-DC converter 320. As the 380 V input drops to, e.g., 350 V, the DC-DC converter 320 may adjust its duty cycle to 76%, to maintain the desired output in view of the input drop (e.g., maintain a 12 V output). As the input drops further, e.g., to 240 V, the DC-DC converter 320 may reach a 100% duty cycle, but still be limited to outputting approximately 10.8 V under these circumstances. However, if power factor correction is turned off, the voltage will be peak charged to the input line potential peak. For 115 V in North America, the peak corresponds to approximately 170 V. Thus, the output DC-DC converter 320 may be run at its highest duty cycle possible without exceeding a 12 V or other desired output.

Thus, example systems may turn off a controller for the PFC boost converter, stop switching, and eliminate losses associated with those two techniques. Furthermore, example systems may increase a duty cycle to as high as can be supported on the output DC-DC converter for a given input voltage and desired output voltage. This further increases conversion efficiency, saving power and exploiting the design parameters associated with standby or other light-load conditions where tight 12 V regulation is not needed to operate a load. For example, an output voltage level may be provided just above a minimum input voltage for a least-tolerant sub-load (e.g., a DC-DC regulator) associated with a load to receive output power.

Figure 4:
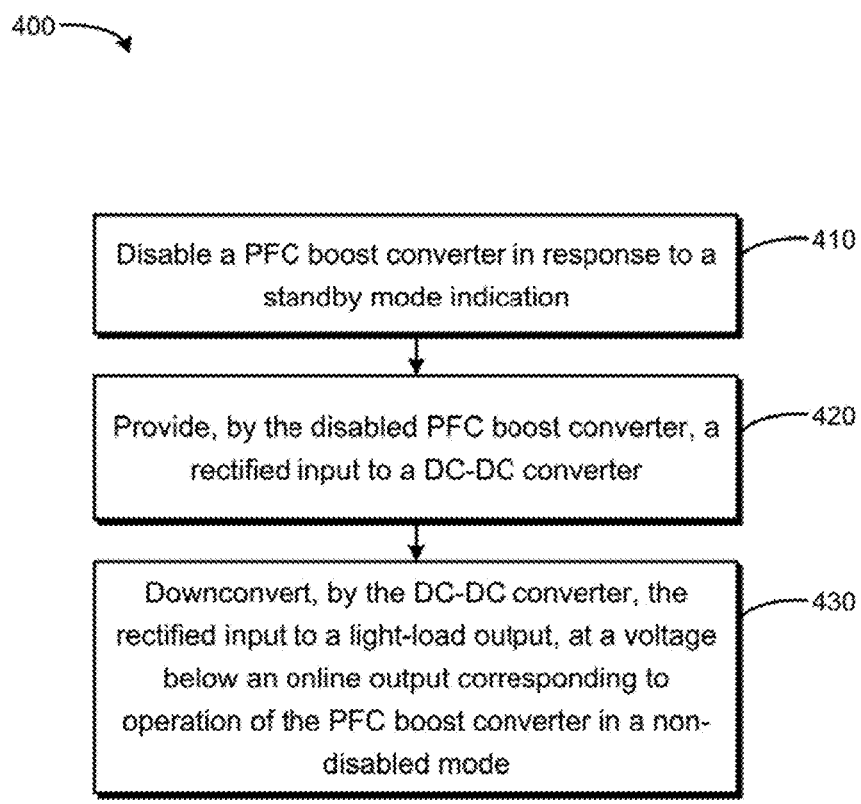
FIG. 4 is a flow chart based on downconverting a rectified input according to an example.
Figure 5:
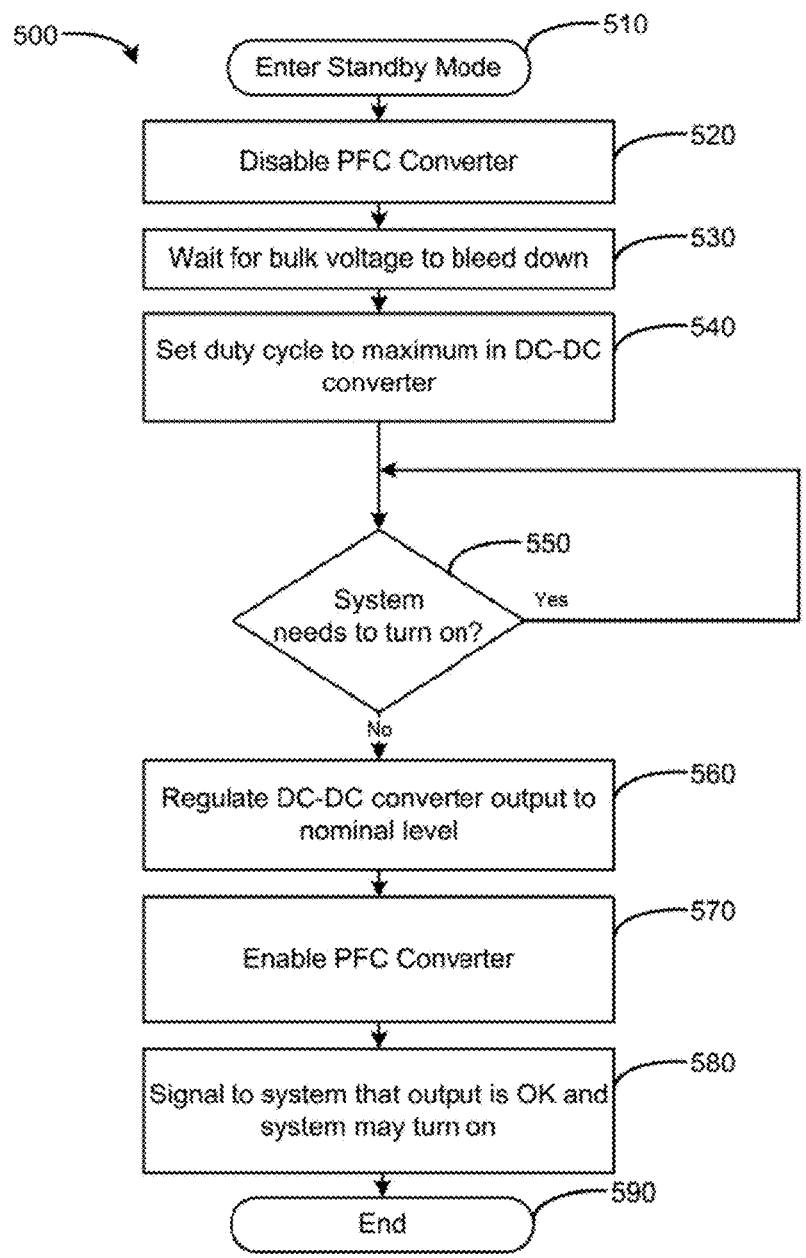
FIG. 5 is a flow chart based on a standby mode according to an example.

Referring to FIGS. 4 and 5, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 4 is a flow chart 400 based on downconverting a rectified input according to an example. In block 410, a PFC boost converter is disabled in response to a standby mode indication. For example, a server may indicate that it is to enter a standby mode associated with reduced power requirements. The PFC boost converter may disable its controller and stop switching. In block 420, the disabled PFC boost converter is to provide a rectified input to a DC-DC converter. For example, a boost portion of the PFC boost converter is disabled, along with a controller for the boosting, such that the PFC boost converter may rectify an input signal to provide the rectified input to the DC-DC converter. In block 430, the DC-DC converter is to downconvert the rectified input to an output voltage below a value corresponding to an output of the DC-DC converter during operation of the PFC boost converter in a non-disabled mode. For example, the DC-DC converter may adjust a duty cycle to an increased value, in view of the rectified input, to generate an output at a voltage exceeding a threshold voltage needed by the server in standby mode. The DC-DC converter may adjust the duty cycle for maximizing efficiency, and also may adjust the duty cycle for regulating the output voltage to ensure the output remains above a threshold value.

FIG. 5 is a flow chart 500 based on a standby mode according to an example. Flow begins at block 510. In block 520, the PFC converter is disabled. For example, the PFC converter may have its controller shut off and boost functionality disabled, to pass a rectified signal. In block 530, the system is to wait for bulk voltage to bleed down. For example, the PFC converter may use a capacitor to boost voltage. The capacitor may be charged above a voltage of the rectified signal, such that the capacitor's bulk voltage will be allowed to bleed down to nominal input voltage over time. In block 540, a duty cycle of the DC-DC converter is set to a maximum. For example, the duty cycle may be set to a value corresponding to generating a desired output voltage that is lower than when the PFC boost converter is enabled, but yet higher than a threshold voltage needed to operate the system in standby mode. For example, the DC-DC converter may use a duty cycle to achieve a 6 V output. Further, the duty cycle may be adjusted to enable the DC-DC converter to provide a regulated 6 V output (e.g., that remains steady despite variations to the rectified input from the disabled PFC converter). In block 550, it is checked whether the system needs to turn on (e.g., come out of standby mode). For example, the converter system may check for an exit indication from, e.g., a server or other system receiving output, that is going to turn on and come out of standby mode. In block 560, the output of the DC-DC converter is regulated to a nominal level. For example, the DC-DC converter may have its duty cycle adjusted to raise its output from a lower light-load output voltage (e.g., 6 V) to a higher online output voltage (e.g., 12 V). In block 570, the PFC converter is enabled. For example, the PFC converter's controller may be activated and switching may be resumed to enable its voltage boosting functionality. In block 580, the converter system is to signal to a receiving system that output is OK and the receiving system may turn on. Flow ends at block 590.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., a computing device) can include and/or receive a tangible non-transitory computer-readable medium storing a set of computer-readable instructions (e.g., software). As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. An apparatus comprising:
    a power factor correcting (PFC) boost converter to convert an input to an intermediate direct current (DC) signal; and
    a DC-DC converter to receive the intermediate DC signal and generate an output associated with an online condition;
    wherein, in response to a light-load indication, the PFC boost converter is to assume a disabled status to pass a rectified input to the DC-DC converter, and the DC-DC converter is to convert the rectified input to generate an output associated with a light-load condition, wherein the output associated with the light-load condition has a voltage lower than the output associated with the online condition,
    wherein the DC-DC converter is to regulate the output associated with the light-load condition by varying a duty cycle in view of the rectified input and a minimum threshold voltage for operation of a downstream DC-DC converter that provides a regulated output voltage based on the output associated with the light-load condition from the DC-DC converter.

2. The apparatus of claim 1, wherein the DC-DC converter is to provide the output associated with the light-load condition at less than 12 volts (V).

3. The apparatus of claim 1, wherein the light-load indication of the light-load condition includes a standby mode indication from a system comprising the downstream DC-DC converter.

4. The apparatus of claim 1, wherein the DC-DC converter is to provide the output associated with the online condition or the output associated with the light-load condition at a common node coupleable to a standby load and an online load.

5. The apparatus of claim 1, wherein the downstream DC-DC converter is a first downstream DC-DC converter to provide the regulated output voltage for the light-load condition, and
    wherein the DC-DC converter is to provide the output associated with the online condition to a second downstream DC-DC converter that provides a regulated output voltage for the online condition.

6. The apparatus of claim 1, wherein the PFC boost converter is disabled by turning off a PFC boost converter controller and stopping the PFC boost converter from switching.

7. The apparatus of claim 1, further comprising a capacitor to store energy at an output of the PFC boost converter and an input of the DC-DC converter, to increase tolerance of a voltage range associated with an input to the DC-DC converter.

8. The apparatus of claim 1, wherein, in response to an exit indication to exit the light-load condition, the DC-DC converter is to regulate to a nominal level an output from the DC-DC converter, the PFC boost converter is to be enabled, and the apparatus is to generate a ready indication.

9. A system comprising:
    a power factor correcting (PFC) boost converter to convert an input to an intermediate direct current (DC) signal;
    a first DC-DC converter to receive the intermediate DC signal and generate an output associated with an online condition;
    a server to operate using the output associated with the online condition, and generate a light-load indication of a light-load condition at the server, the server comprising a second DC-DC converter; and
    a controller to receive the light-load indication and, in response to the light-load indication, cause the PFC boost converter to operate in a disabled status to generate a rectified input, and direct the first DC-DC converter to convert the rectified input to provide an output associated with the light-load condition, at a voltage lower than the output associated with the online condition,
    wherein the first DC-DC converter is to regulate the output associated with the light-load condition by varying a duty cycle in view of the rectified input and a minimum threshold voltage for operation of the second DC-DC converter that provides a regulated output voltage based on the output associated with the light-load condition from the first DC-DC converter;
    wherein the server is to operate in the light-load condition using the output associated with the light-load condition.

10. The system of claim 9, wherein the controller is to receive an exit indication from the server to exit the light-load condition, and in response to the exit indication, regulate an output of the first DC-DC converter to a nominal level, enable the PFC boost converter, and generate a ready signal receivable by the server.

11. A method, comprising:
    disabling a power factor connecting (PFC) boost converter in response to a standby mode indication;
    providing, by the disabled PFC boost converter, a rectified input to a first DC-DC converter;
    downconverting, by the first DC-DC converter, the rectified input to a light-load output, at a voltage below an online output of the first DC-DC converter corresponding to an operation of the PFC boost converter in a non-disabled mode; and
    regulating, by a first DC-DC converter, the light-load output by varying a duty cycle in view of the rectified input and a minimum threshold voltage for operation of a second DC-DC converter, downstream of the first DC-DC converter, that provides a regulated output voltage based on the light-load output from the first DC-DC converter.

12. The method of claim 11, further comprising:
receiving an exit indication to exit a standby mode; and
in response to the exit indication:
- regulating an output of the DC-DC converter to a nominal level;
- enabling the PFC boost converter; and
- generating a ready signal.

13. The apparatus of claim 1, further comprising:
a controller to communicate with a system comprising the downstream DC-DC converter, and to determine, based on the communication with the system, whether the system is operating in the online condition or the light-load condition, wherein the controller is to provide the light-load indication to the PFC converter in response to determining that the system is operating in the light-load condition.

14. The apparatus of claim 13, wherein the controller is to activate the PFC converter from the disabled status in response to determining that the system has transitioned from the light-load condition to the online condition.

15. The apparatus of claim 1, wherein the PFC converter comprise a rectifier and a switch, the rectifier to convert an alternating current (AC) voltage to a DC voltage.

16. The system of claim 9, wherein the server comprises a third DC-DC converter to regulate the output associated with the online condition from the first DC-DC converter, wherein the server is to use the third DC-DC converter during the online condition, and to use the second DC-DC converter during the light-load condition.

17. The method of claim 11, wherein the second DC-DC converter is used by a system comprising a first load operated in a standby mode.

18. The method of claim 17, further comprising:
providing the online output of the first DC-DC converter to a third DC-DC converter of the system that comprises a second load operated in an online mode.

* * * * *